Sept. 3, 1940.   T. W. HIGGINS ET AL   2,213,910
TIRE CHAIN ANCHORING AND APPLICATOR MEANS
Filed Nov. 26, 1938
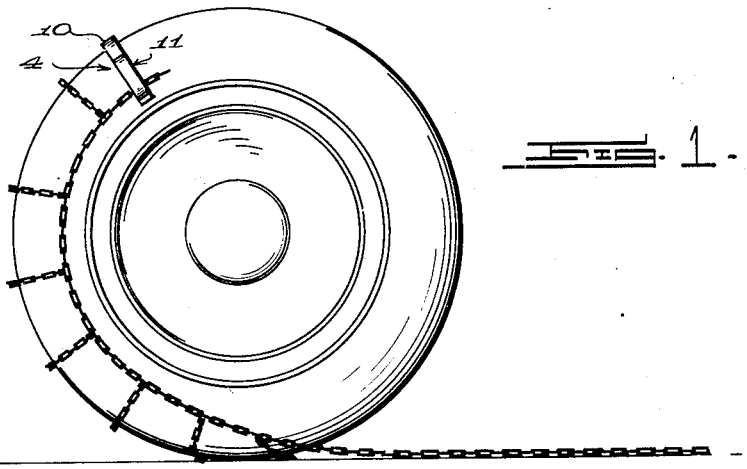
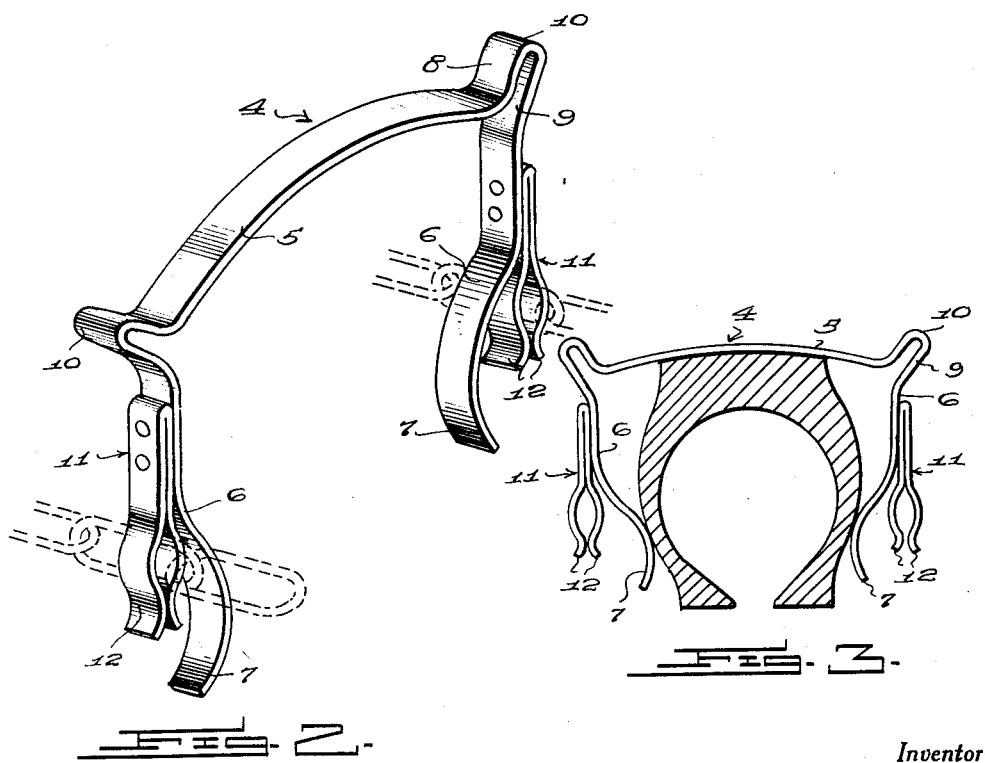
Inventors
THOMAS W. HIGGINS
THOMAS J. LAWLER
By Clarence A. O'Brien
and Hyman Berman
Attorneys Patented Sept. 3, 1940

2,213,910

UNITED STATES PATENT OFFICE 2,213,910

TIRE CHAIN ANCHORING AND APPLICATOR MEANS

Thomas W. Higgins and Thomas J. Lawler, Mahanoy City, Pa.

Application November 26, 1938, Serial No. 242,624

2 Claims. (Cl. 81—15.8)

This invention relates to that category of automotive accessories and equivalent appliances and devices embodying mechanical means so constructed as to expedite the handling and applying of anti-skid chains to pneumatic tire equipped automobile wheels and the like.

As the statement of the invention implies, it is evident that we are at present possessed of sufficient knowledge of the prior art, to appreciate that similar devices have been patented and marketed, calculated to accomplish the result which we too, seek to achieve. Despite this fact, and notwithstanding the high state of development of the art, we have found it practicable and expedient to devise and bring into being what is believed to be a structurally refined, improved and otherwise novel contribution to this field of endeavor, something which is more appropriate for the intended purpose and therefore susceptible of better satisfying the demands of motorists and the trade in general.

In setting out to accomplish these ends, we have developed an unusually simple and economical accessory so designed and perfected as to accomplish expected results by saving time and gratifying the wishes of the user because of the unusual adaptability of this improved invention to fulfill ordinary needs and requirements.

Other features and advantages will become more readily apparent from the following detailed description and drawing.

In the drawing:

Figure 1 is a side elevational view showing an automobile tire equipped wheel, a conventional chain, and the adapter and anchoring device in the position it occupies when in use.

Figure 2 is a perspective view illustrating the device per se and showing to advantage the particular configuration and specific construction thereof.

Figure 3 is a view in cross section through a tire casing showing how the device appears when applied in place without the chain.

Referring now to the drawing by distinguishing reference numerals, it is evident that the attachment, as a whole, is denoted by the numeral 4. This part of the assembly is preferably constructed from strap metal of appropriate resilient property. Being substantially U-shaped, in edge view, the main unit embodies a longitudinally bowed connective or bight portion 5 and a pair of right angularly disposed limbs, these forming grips or clamps for the tire casing. The latter members have their intermediate portions of suitably curved configuration as at 6 to conform to the corresponding side walls of the tire in properly spaced relation. The free ends are flared outwardly at the points 7 to facilitate placement of the device over the tire in the arching position illustrated. Those portions of the metal strap constituting the junctures between the clamping grips and the bight portion are fashioned to provide a pair of duplicate outwardly diverging members. These serve as finger-grips in one instance, and in so doing facilitate application and removal. Then too, they have the function of springs, allowing the necessary relative freedom of play of the so-called gripping or clamping limbs. Further, these "springs" provide clearance spaces to maintain conformity of the device with the casing as it is bulged and flattened out, that is when the device 4 is brought around in contact with the ground or other surface. Specifically, these spring-grips are formed by companion lateral parallel bends 8 and 9 and the connecting webs 10.

Not only do the clamping limbs constitute retention elements for the frame unit 4, but they also have the added function of supports for the duplicate tire chain anchoring clips 11. These clips are riveted or otherwise secured to the outer faces of the limbs and have their parallel jaws 12 conveniently shaped and located to accommodate the chain links.

To appreciate the outstanding features of merit and distinction, and method of use, attention is directed to the following.

The free ends of the tire chain, opposite the standard-style locks (not shown), are first placed in the spring clips 11, preferably the second or the third links, as shown. The clamp itself is then pressed or forced over the tire just beneath the car fender. The car is then backed up, and the clamp conveys the chain around the tire, as is evident. The wheel of the car may also be jacked up, the clamp applied the same as explained above, and the wheel turned by hand. With the older type cars, the car may be run forward as well as backward as the older models have much higher fenders with more clearance. The chain should be drawn around the wheel until the clamp is beneath the fender. The clamp holds the end links firmly, enabling the motorist to fasten the locks in place with one hand. After the locks have been fastened, the clamp may easily be removed by pulling on the finger-grips.

It will be further noted that the chain grips 11 are mounted at points of vantage on the resilient retention limbs to expedite attaching and detaching of the chain links. Furthermore, the proportions and shape contribute their proportionate share to insure proper functioning of the device under substantially all conditions.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

We claim:

1. A tire chain anchoring and applicator device of the class described comprising a frame of resilient strap metal including a centralized bight outwardly and longitudinally bowed, a pair of substantially parallel longitudinally bowed companion arms opposed to each other and disposed at right angles to said bight, and conspicuously distinct intervening U-shaped relatively small bends connecting the inner ends of the respective arms with the opposite outer ends of said bight, said U-shaped bends being disposed at approximate obtuse angles in relation to the bight and having their crest portions projecting laterally and outwardly to points well beyond the crown of the bight to function as combined springs and finger-grips, the free ends of said arms being flared outwardly to expedite engagement with the opposed side walls of a conventional pneumatic tire, and independent chain link receiving and retaining clips secured to the exterior surfaces of the intermediate areas of said arms.

2. A tire chain anchoring and applicator device of the class described comprising a frame of resilient strap metal including a centralized bight outwardly and longitudinally bowed, a pair of substantially parallel longitudinally bowed companion arms opposed to each other and disposed at right angles to said bight, and conspicuously distinct intervening U-shaped relatively small bends connecting the inner ends of the respective arms with the opposite outer ends of said bight, said U-shaped bends being disposed at approximate obtuse angles in relation to the bight and having their crest portions projecting laterally and outwardly to points well beyond the crown of the bight to function as combined springs and finger-grips, the free ends of said arms being flared outwardly to expedite engagement with the opposed side walls of a conventional pneumatic tire, and independent chain link receiving and retaining clips secured to the exterior surfaces of the intermediate areas of said arms, said clips including resilient gripping jaws and longitudinally elongated shanks, the shanks being riveted to the arms to position the clips in longitudinal alignment with said arms.

THOMAS J. LAWLER.
THOMAS W. HIGGINS.